United States Patent
Lee et al.

(10) Patent No.: US 10,129,690 B2
(45) Date of Patent: Nov. 13, 2018

(54) METHOD FOR SELECTING CHANNEL AND AN ELECTRONIC DEVICE THEREOF

(71) Applicant: Samsung Electronics Co., Ltd., Gyeonggi-do (KR)

(72) Inventors: Tae-Young Lee, Seoul (KR); Jae-Eun Kang, Gyeonggi-do (KR); Han-Su Kang, Seoul (KR); Sung-Il Park, Gyeonggi-do (KR); Seong-Hee Park, Seoul (KR); Bong-Jhin Shin, Gyeonggi-do (KR); Chil-Youl Yang, Gyeonggi-do (KR); Myoung-Hwan Lee, Gyeonggi-do (KR); Jang-Hee Lee, Gyeonggi-do (KR); Chun-Ho Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/742,058

(22) Filed: Jun. 17, 2015

(65) Prior Publication Data
US 2015/0365986 A1 Dec. 17, 2015

(30) Foreign Application Priority Data
Jun. 17, 2014 (KR) ........................ 10-2014-0073309

(51) Int. Cl.
*H04W 72/08* (2009.01)
*H04W 4/00* (2018.01)
(Continued)

(52) U.S. Cl.
CPC ............ *H04W 4/008* (2013.01); *H04B 1/715* (2013.01); *H04W 4/80* (2018.02); *H04W 16/14* (2013.01);
(Continued)

(58) Field of Classification Search
None
See application file for complete search history.

(56) References Cited

U.S. PATENT DOCUMENTS

| 8,656,064 B2 * | 2/2014 | Masuda | H04M 1/7253 710/1 |
| 8,774,722 B2 * | 7/2014 | Hsu | H04W 52/16 455/522 |

(Continued)

FOREIGN PATENT DOCUMENTS

| KR | 1020100107215 | 10/2010 |
| WO | WO 03/090037 | 10/2003 |

(Continued)

OTHER PUBLICATIONS

3GPP SA 3, "Requirements to be Realized in SAP (SIM Access Profile) when Bluetooth is used as Local Interface for Authentication of Peripheral Devices", S3-040839, 3GPP TSG SA WG3 Security—SA3#35, Oct. 5-8, 2004, 2 pages.

(Continued)

*Primary Examiner* — Kibrom T Hailu
(74) *Attorney, Agent, or Firm* — The Farrell Law Firm, P.C.

(57) ABSTRACT

The present disclosure relates to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services. An electronic device, a method of an electronic device, and a method of a terminal apparatus are provided. The electronic device includes a first module configured to transmit/receive a signal through a first transmission interface, a second module configured to transmit/receive a signal (Continued)

through a second transmission interface, and a controller configured to set a channel for transmitting/receiving a signal to/from an other electronic device through the second transmission interface, based on a quality of at least one channel transmitting/receiving a signal to/from the other electronic device through the first transmission interface.

40 Claims, 15 Drawing Sheets

(51) Int. Cl.

| | | |
|---|---|---|
| *H04B 1/715* | (2011.01) | |
| *H04W 16/14* | (2009.01) | |
| *H04W 76/16* | (2018.01) | |
| *H04W 4/80* | (2018.01) | |
| *H04W 76/14* | (2018.01) | |
| *H04B 1/403* | (2015.01) | |
| *H04W 88/06* | (2009.01) | |
| *H04W 72/12* | (2009.01) | |
| *H04W 84/12* | (2009.01) | |
| *H04B 17/309* | (2015.01) | |
| *H04W 84/18* | (2009.01) | |

(52) U.S. Cl.
CPC ......... *H04W 72/085* (2013.01); *H04W 76/14* (2018.02); *H04W 76/16* (2018.02); *H04B 1/406* (2013.01); *H04B 17/309* (2015.01); *H04B 2001/7154* (2013.01); *H04W 72/1215* (2013.01); *H04W 72/1226* (2013.01); *H04W 84/12* (2013.01); *H04W 84/18* (2013.01); *H04W 88/06* (2013.01)

(56) References Cited

U.S. PATENT DOCUMENTS

| | | | | |
|---|---|---|---|---|
| 9,326,310 | B2* | 4/2016 | Zhang | H04W 16/14 |
| 2007/0149230 | A1 | 6/2007 | Song et al. | |
| 2007/0161349 | A1* | 7/2007 | Grushkevich | H04W 16/14 |
| | | | | 455/41.2 |
| 2007/0183338 | A1* | 8/2007 | Singh | H04W 16/14 |
| | | | | 370/252 |
| 2008/0045152 | A1* | 2/2008 | Boes | H04W 16/14 |
| | | | | 455/63.1 |
| 2008/0219323 | A1 | 9/2008 | Desai et al. | |
| 2009/0111496 | A1* | 4/2009 | Ibrahim | H04W 72/085 |
| | | | | 455/512 |
| 2009/0130977 | A1 | 5/2009 | Grushkevich et al. | |
| 2009/0191828 | A1* | 7/2009 | Ibrahim | H03J 1/0008 |
| | | | | 455/150.1 |
| 2009/0258607 | A1* | 10/2009 | Beninghaus | H04B 1/3805 |
| | | | | 455/77 |
| 2009/0258609 | A1* | 10/2009 | Miyoshi | H04B 7/0413 |
| | | | | 455/101 |
| 2010/0120362 | A1 | 5/2010 | Walley et al. | |
| 2010/0130129 | A1 | 5/2010 | Chang et al. | |
| 2010/0302982 | A1* | 12/2010 | Hsu | H04W 74/004 |
| | | | | 370/311 |
| 2011/0312288 | A1 | 12/2011 | Fu et al. | |
| 2012/0040623 | A1* | 2/2012 | Liu | G06F 1/3203 |
| | | | | 455/67.13 |
| 2012/0040715 | A1 | 2/2012 | Fu et al. | |
| 2012/0076173 | A1 | 3/2012 | Chang et al. | |
| 2012/0244814 | A1* | 9/2012 | Okayasu | H04M 1/6066 |
| | | | | 455/41.3 |
| 2012/0303182 | A1* | 11/2012 | Choi | H04W 4/046 |
| | | | | 701/2 |
| 2013/0178160 | A1* | 7/2013 | Wang | H04W 48/10 |
| | | | | 455/41.2 |
| 2013/0318158 | A1* | 11/2013 | Teng | H04L 67/42 |
| | | | | 709/203 |
| 2013/0324112 | A1* | 12/2013 | Jechoux | H04W 72/1215 |
| | | | | 455/426.1 |
| 2013/0331137 | A1 | 12/2013 | Burchill et al. | |
| 2014/0119347 | A1* | 5/2014 | Szymanski | H04W 72/082 |
| | | | | 370/336 |
| 2014/0254634 | A1* | 9/2014 | Hsu | H04W 52/16 |
| | | | | 375/133 |
| 2014/0315490 | A1* | 10/2014 | Hughes | H04W 4/008 |
| | | | | 455/41.2 |
| 2014/0323048 | A1* | 10/2014 | Kang | H04W 76/023 |
| | | | | 455/41.2 |
| 2014/0378058 | A1* | 12/2014 | Decuir | H04W 4/008 |
| | | | | 455/41.2 |
| 2015/0133185 | A1* | 5/2015 | Chen | H04W 72/1215 |
| | | | | 455/552.1 |
| 2015/0271808 | A1* | 9/2015 | Liang | H04W 4/008 |
| | | | | 370/329 |

FOREIGN PATENT DOCUMENTS

| | | |
|---|---|---|
| WO | WO 2012/110442 | 8/2012 |
| WO | WO 2013/104951 | 7/2013 |

OTHER PUBLICATIONS

International Search Report dated Oct. 5, 2015 issued in counterpart application No. PCT/KR2015/006135, 9 pages.
Carla F. Chiasserini et al., "Coexistence Mechanisms for Interference Mitigation between IEEE 802.11 WLANs and Bluetooth", IEEE INFOCOM, Jun. 23-27, 2002, 9 pages.
European Search Report dated Oct. 5, 2017 issued in counterpart application No. 15809293.2-1870, 11 pages.

* cited by examiner

METHOD FOR SELECTING CHANNEL AND AN ELECTRONIC DEVICE THEREOF

PRIORITY

This application claims priority under 35 U.S.C. § 119(a) to a Korean Patent Application filed on Jun. 17, 2014 in the Korean Intellectual Property Office and assigned Serial No. 10-2014-0073309, the entire contents of which are incorporated herein by reference.

BACKGROUND

1. Field of the Invention

The present invention relates to an electronic device of a wireless communication system, and more particularly, to an apparatus and method for managing access between electronic devices.

2. Description of the Related Art

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In recent years, electronic devices such as portable terminals are on a suddenly increasing trend of use because of their convenient portability. With an increase of use of portable electronic devices, service providers (i.e., terminal manufacturers) are competitively developing more convenient supplementary functions to secure users. A Bluetooth (BT) function, one of the developed supplementary functions, is a communication technology between terminals within a short range. Recently, portable electronic devices are providing various services such as headset music listening, printing, file transmission, and the like using the Bluetooth function.

The Bluetooth technology is the technology standard is defined by the non-profit organization "BLUETOOTH SIG" to provide inexpensive short-range wireless access for data and voice using 2.4 Giga Hertz (GHz). The Bluetooth technology is based on the Institute of Electrical and Electronics Engineers (IEEE) 802.11 standard. Because the Bluetooth technology may also form several independent piconets overlapping with one another in the same space, the Bluetooth technology is applicable even to an area in which information processing and communicating devices are of a high density. In addition, the Bluetooth technology has transmission error correction, identification, coding, and power saving functions.

However, when a host device releases a Bluetooth connection and establishes a Wireless Fidelity (Wi-Fi) connection, a use channel decision method uses a Wi-Fi channel quality measurement method or a user manual designation method. Because of this, the Bluetooth technology has a problem in which, upon making a Wi-Fi connection, the time required becomes significant or channel selection is not effective.

Accordingly, there is a need for an apparatus and method for a more stable Wi-Fi connection upon a Wi-Fi setting.

SUMMARY

The present invention has been made to address the above-mentioned problems and disadvantages, and to provide at least the advantages described below.

Accordingly, an aspect of the present invention provides an apparatus and method for management of access between electronic devices.

Another aspect of the present invention provides an apparatus and method in which an electronic device performs handover to another network while maintaining a service.

Another aspect of the present invention provides a user environment in which, before disconnection of an electronic device, the electronic device performs handover to another network, thereby providing a seamless service.

An electronic device is provided. The electronic device includes a first module configured to transmit/receive a signal through a first transmission interface, a second module configured to transmit/receive a signal through a second transmission interface, and a controller configured to set a channel for transmitting/receiving a signal to/from an other electronic device through the second transmission interface, based on a quality of at least one channel transmitting/receiving a signal to/from the other electronic device through the first transmission interface.

An electronic device is provided. The electronic device includes a first module configured to transmit/receive a signal through a first transmission interface, a second module configured to transmit/receive a signal through a second transmission interface, and a controller configured to set the second transmission interface through a selected channel in response to a transmission interface conversion request sent through the first transmission interface, and select the channel through channel quality comparison.

A method of an electronic device is provided. The method includes transmitting/receiving a signal through a first transmission interface, transmitting/receiving a signal through a second transmission interface, and setting a channel for transmitting/receiving a signal to/from an other electronic device through the second transmission interface, based on a quality of at least one channel transmitting/receiving a signal to/from the other electronic device through the first transmission interface.

A method of a terminal apparatus is provided. The method includes transmitting/receiving a signal through a first transmission interface, transmitting/receiving a signal through a second transmission interface, and communicating by a selected channel through the second transmission interface in response to a transmission interface conversion request sent through the first transmission interface, wherein the channel is selected through channel quality comparison.

BRIEF DESCRIPTION OF THE DRAWINGS

The above and other aspects, features and advantages of the present invention will be more apparent from the following detailed description, taken in conjunction with the accompanying drawings in which.

Figure 1:
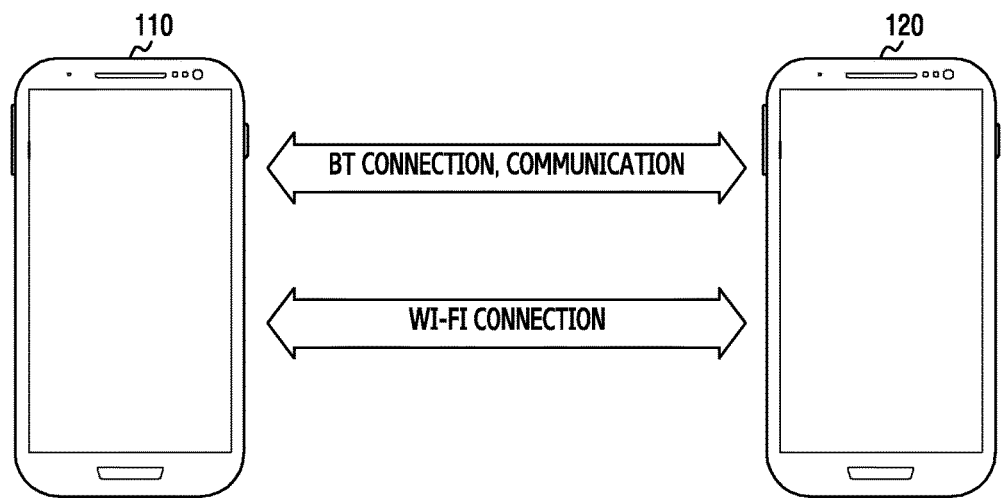
FIG. 1 illustrates a connection between electronic devices according to an embodiment of the present invention.

DETAILED DESCRIPTION OF EMBODIMENTS
OF THE PRESENT INVENTION

The present invention is described below with reference to the accompanying drawings. The present invention may include various modifications and may have several embodiments. Thus, certain embodiments are illustrated in the accompanying drawings and a related detailed description is provided below. However, these embodiments are not intended to limit the present invention to a certain embodiment, and the present invention should be understood as including all modifications and/or equivalents or alternatives within the scope and spirit of the present invention. In relation to a description of the drawing, like constituent elements are denoted by like reference symbols.

The expressions "comprise," "may comprise" or the like used in the present disclosure indicate the existence of disclosed corresponding functions, operations, constituent elements or the like, and do not limit additional one or more functions, operations, constituent elements or the like. Also, it should be understood that the terms "comprise," "have" or the like in the present disclosure designate the existence of features stated in the present disclosure, numerals, steps, operations, constituent elements, components, or a combination of them, and do not preclude the possibility of the existence or addition of one or more other features, numerals, steps, operations, constituent elements, components, or combinations of them.

The expression "or" in the present disclosure includes any and all combinations of words enumerated together. For example, "A or B" may include A, B, or A and B.

The expressions such as "$1^{st}$," "$2^{nd}$," "first," "second" or the like used in the present invention may modify various constituent elements of the present invention, but are not intended to limit the corresponding constituent elements. For example, the expressions do not limit the order and/or importance and the like of the corresponding constituent elements. The expressions may be used to distinguish one constituent element from another constituent element. For example, a first user device and a second user device are user devices, and represent different user devices. For example, a first constituent element may be referred to as a second constituent element without departing from the scope or spirit of the present invention. Accordingly, a second constituent element may be referred to as a first constituent element.

When it is described that a constituent element is "connected to" or "accessed by" another constituent element, the constituent element may be directly connected to or accessed by the other constituent element, but it should be understood that another constituent element may exist between the constituent element and the other constituent element. In contrast, when it is described that a constituent element is "directly connected to" or "directly accessed by" another constituent element, it should be understood that no other constituent element exists between the constituent element and the other constituent element.

The terms used in the present disclosure are used merely for describing certain embodiments, and are not intended to limit the present invention. The expression of a singular number includes the expression of a plural number unless the context clearly dictates otherwise.

Unless defined otherwise, all of the terms used herein including the technological or scientific terms have the same meaning as those commonly understood by a person having ordinary knowledge in the art which the present invention belongs to. The terms as defined in a general dictionary should be interpreted as having the same meanings as the contextual meanings of a related technology, and are not to be interpreted as having ideal or excessively formal meanings unless clearly defined in the present invention.

An electronic device according to the present invention may be a device including a telecommunication function. For example, an electronic device may include at least one of a smart phone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), a Moving Picture Experts Group (MPEG) Audio Layer 3 (MP3) player, a mobile medical instrument, a camera, or a wearable device (e.g., a Head Mounted Display (HMD) such as electronic glasses, electronic clothes, an electronic bracelet, an electronic necklace, an appcessory, an electronic tattoo, or a smart watch).

According to an embodiment of the present invention, an electronic device may be a smart home appliance having a telecommunication function. A smart home appliance may include, for example, at least one of a television, a Digital Video Disk (DVD) player, an audio system, a refrigerator, an air conditioner, a cleaner, an oven, a microwave, a washing machine, an air cleaner, a set-top box, a TV box (for example, Samsung HomeSync™, Apple TV™, or Google TV™), a game console, an electronic dictionary, an electronic locking system, a camcorder, or an electronic frame.

According to an embodiment of the present invention, an electronic device may include at least one of various medical instruments (e.g., a Magnetic Resonance Angiography (MRA) device, a Magnetic Resonance Imaging (MRI) device, a Computerized Tomography (CT) device, a movie-camera, an ultrasonic machine and the like), a navigation device, a Global Positioning System (GPS) receiver, an Event Data Recorder (EDR), a Flight Data Recorder (FDR), a car infotainment device, electronic equipment for a ship (e.g., a navigation device for a ship, a gyrocompass and the like), avionics, a security instrument, a car head unit, an industrial or home robot, an Automatic Teller Machine (ATM) of a financial institution, or a Point of Sale (PoS) device of a vendor.

According to an embodiment of the present invention, an electronic device may include at least one of a part of furniture or building/structure including a telecommunication function, an electronic board, an electronic signature receiving device, a projector, or various metering instruments (e.g., a water meter, an electricity meter, a gas meter, a radio wave metering instrument or the like). An electronic device according to the present invention may be one of the aforementioned various devices or a combination of two or more of them. Also, an electronic device according to the present invention may be a flexible device. Also, it is obvious to those skilled in the art that an electronic device according to the present invention is not limited to the aforementioned instruments.

Below, the present disclosure describes a technology for managing a transmission interface connection of an electronic device. In the following description, an electronic device includes a Bluetooth device, and a transmission interface includes a Bluetooth network, a Wireless Fidelity (Wi-Fi) network, a Long Term Evolution (LTE) network, and the like.

FIG. 1 illustrates a connection between electronic devices 110 and 120 according to an embodiment of the present invention.

Referring to FIG. 1, the electronic device 110 connects with the other electronic device 120 and transmits/receives information to/from the other electronic device 120. A method of connecting the electronic device 110 to the other electronic device 120 includes a method of connecting using a Bluetooth network, a method of connecting using a Wi-Fi network, a method of connecting through a cellular network (i.e., 3rd Generation/4th Generation (3G/4G)), or the like. Also, the electronic device 110 and the other electronic device 120 include a communication device, such as a Bluetooth device, a Personal Computer (PC), a laptop computer, a cellular phone, and the like. In the present invention, while the electronic device 110 is connected to the other electronic device 120 through a Bluetooth network, if a certain event occurs, the electronic device 110 changes a transmission interface (i.e., the Bluetooth network) to a Wi-Fi network.

Figure 2:
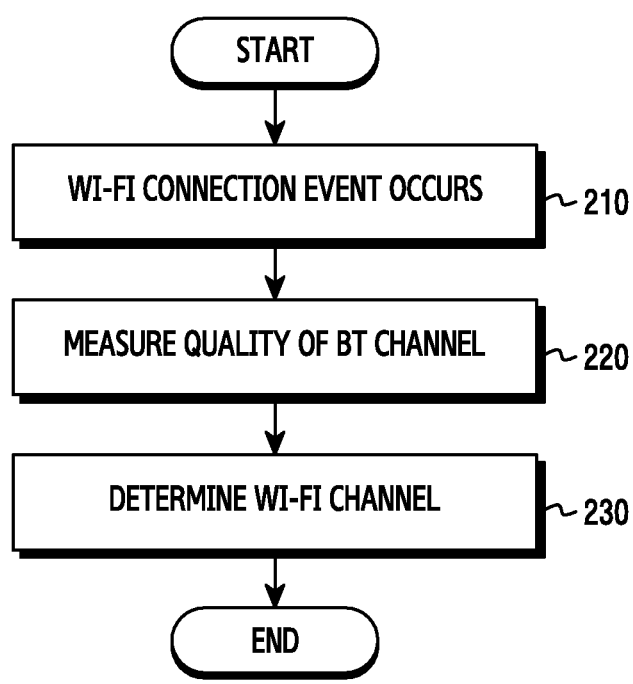
FIG. 2 is a flowchart of a channel determination method of an electronic device according to an embodiment of the present invention.

FIG. 2 is a flowchart of a channel determination method of an electronic device according to an embodiment of the present invention.

Referring to FIG. 2, in step 210, the electronic device checks the occurrence of a Wi-Fi connection event. According to an embodiment of the present invention, while connecting and communicating with the other electronic device through a Bluetooth network, the electronic device checks the occurrence of the Wi-Fi connection event if setting another network, for example, a Wi-Fi network, not the Bluetooth network, as a transmission interface.

In step 220, the electronic device measures the qualities of Bluetooth channels. To use an overlapping Bluetooth frequency band and a Wi-Fi frequency band, the electronic device measures the qualities of the Bluetooth channels. After measuring the qualities of the Bluetooth channels, the electronic device judges whether a Wi-Fi channel having the same band as the Bluetooth channel of the best channel quality is a Wi-Fi channel of the best state.

In step 230, the electronic device determines the judged Wi-Fi channel of the best state, as a Wi-Fi channel for connecting to the other electronic device. A method of determining the Wi-Fi channel in the electronic device may be a method of summing and comparing quality index values of Bluetooth channels overlapped by each Wi-Fi channel using a Bluetooth Adaptive Frequency Hopping (AFH) channel map and determining a channel of a high sum value as the Wi-Fi channel, a method of applying a weight to a quality index of a Bluetooth channel depending on the situation, and the like. The method of applying a weight may be a method of applying a weight depending on a transmission scheme of a transmission interface intended for connection, a method giving a high weight to a channel quality value of a Bluetooth channel having a low congestion rate by country and summing the weighted channel quality values, a method giving high weights to orthogonal channels 1, 6, and 11, or the like. Also, besides the method using the AFH channel map, even a method using a value capable of estimating a channel quality by each transmission interface is possible. Also, there may be a method of selecting a channel of low interference by measuring how much interference a certain channel receives from another transmission interface, or a method of selecting a channel using a channel occupation rate of another transmission interface.

Figure 3:
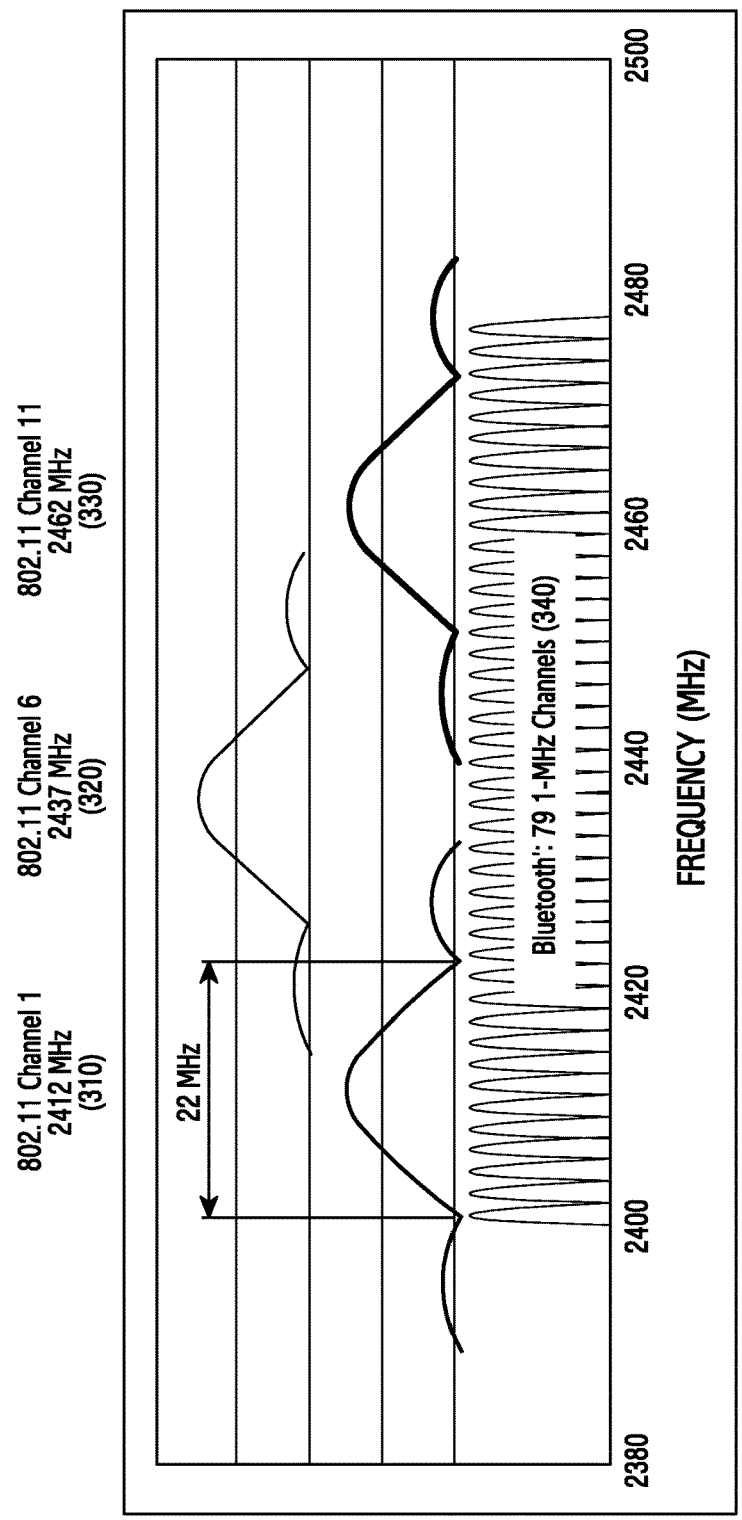
FIG. 3 illustrates frequency bands of a Wireless Fidelity (Wi-Fi) channel and a Bluetooth channel according to an embodiment of the present invention.

FIG. 3 illustrates frequency bands of a Wi-Fi channel and a Bluetooth channel according to an embodiment of the present invention.

In FIG. 3, a horizontal axis represents a frequency (i.e., MHz), and a vertical axis represents the strength of a signal. An 802.11 Wi-Fi channel 1 310 of FIG. 3 has a center frequency of 2412 MHz, is mainly detected between frequencies 2400 MHz and 2425 MHz, and is overlapped with a Bluetooth channel 340 between the 2400 MHz and 2425 MHz. An 802.11 Wi-Fi channel 6 320 has a center frequency of 2437 MHz, is mainly detected between frequencies 2425 MHz and 2450 MHz, and is overlapped with the Bluetooth channel 340 between the 2425 MHz and 2450 MHz. An 802.11 Wi-Fi channel 11 330 has a center frequency of 2462 MHz, is mainly detected between frequencies 2450 MHz and 2475 MHz, and is overlapped with the Bluetooth channel 340 between the 2450 MHz and 2475 MHz. The distribution of Wi-Fi channels dependent on the frequency of the Bluetooth channel is given as in Table 1 to Table 5 below.

TABLE 1

| | Frequency | | | | | | | | | | | | | | | |
|---|---|---|---|---|---|---|---|---|---|---|---|---|---|---|---|---|
| | 00 | 01 | 02 | 03 | 04 | 05 | 06 | 07 | 08 | 09 | 10 | 11 | 12 | 13 | 14 | 15 |
| Bluetooth Channel | | | 0 | 1 | 2 | 3 | 4 | 5 | 6 | 7 | 8 | 9 | 10 | 11 | 12 | 13 |
| Wi-Fi Channel | | | | | 1(center Frequency: 2412 MHz) | | | | | | | | | | | |
| | | | | | | | | | | 2(center Frequency: 2417 MHz) | | | | | | |

TABLE 2

| | Frequency | | | | | | | | | | | | | | | |
|---|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 | 31 |
| Bluetooth Channel | 14 | 15 | 16 | 17 | 18 | 19 | 20 | 21 | 22 | 23 | 24 | 25 | 26 | 27 | 28 | 29 |
| Wi-Fi Channel | | 1(center Frequency: 2412 MHz) | | | | | | | | 6(center Frequency: 2437 MHz) | | | | | | |
| | | | 2(center Frequency: 2417 MHz) | | | | | | | | | | | | | |
| | | | | 3(center Frequency: 2422 MHz) | | | | | | | | | | | | |
| | | | | | 4(center Frequency: 2427 MHz) | | | | | | | | | | | |
| | | | | | | 5(center Frequency: 2432 MHz) | | | | | | | | | | |

TABLE 3

| | Frequency | | | | | | | | | | | | | | | |
|---|---|---|---|---|---|---|---|---|---|---|---|---|---|---|---|---|
| | 32 | 33 | 34 | 35 | 36 | 37 | 38 | 39 | 40 | 41 | 42 | 43 | 44 | 45 | 46 | 47 |
| Bluetooth Channel | 30 | 31 | 32 | 33 | 34 | 35 | 36 | 37 | 38 | 39 | 40 | 41 | 42 | 43 | 44 | 45 |
| Wi-Fi Channel | | | | | | 6(center Frequency; 2437 MHz) | | | | | | | | | | |
| | | | | | | | 7(center Frequency; 2442 MHz) | | | | | | | | | |
| | | | | | | | | 8(center Frequency; 2447 MHz) | | | | | | | | |
| | 4(center Frequency: 2427 MHz) | | | | | | | | 9(center Frerency: 2452 MHz) | | | | | | | |
| | | | 5(center Frequency; 2432 MHz) | | | | | | | | | | | | | |

TABLE 4

| | Frequency | | | | | | | | | | | | | | | |
|---|---|---|---|---|---|---|---|---|---|---|---|---|---|---|---|---|
| | 48 | 49 | 50 | 51 | 52 | 53 | 54 | 55 | 56 | 57 | 58 | 59 | 60 | 61 | 62 | 63 |
| Bluetooth Channel | 46 | 47 | 48 | 49 | 50 | 51 | 52 | 53 | 54 | 55 | 56 | 57 | 58 | 59 | 60 | 61 |
| Wi-Fi Channel | | | | | | 11(center Frequency; 2462 MHz) | | | | | | | | | | |
| | | 7(center Frequency; 2442 MHz) | | | | | | | 12(center Frequency; 2467 MHz) | | | | | | | |
| | | | 8(center Frequency: 2447 MHz) | | | | | | | | | | | | | |
| | | | | 9(center Frequency: 2452 MHz) | | | | | | | | | | | | |
| | | | | | 10(center Frequency: 2457 MHz) | | | | | | | | | | | |

TABLE 5

| | Frequency | | | | | | | | | | | | | | | |
|---|---|---|---|---|---|---|---|---|---|---|---|---|---|---|---|---|
| | 64 | 65 | 66 | 67 | 68 | 69 | 70 | 71 | 72 | 73 | 74 | 75 | 76 | 77 | 78 | 79 |
| Bluetooth Channel | 62 | 63 | 64 | 65 | 66 | 67 | 68 | 69 | 70 | 71 | 72 | 73 | 74 | 75 | 76 | 77 |
| Wi-Fi Channel | | | 11(center Frequency: 2462 MHz) | | | | | | | | | | | | | |
| | | | | 12(center Frequency: 2467 MHz) | | | | | | | | | | | | |
| | | | | | 13(center Frequency: 2472 MHz) | | | | | | | | | | | |
| | 10(center Frequency: 2457 MHz) | | | | | | | | | | | | | | | |

Figure 4:
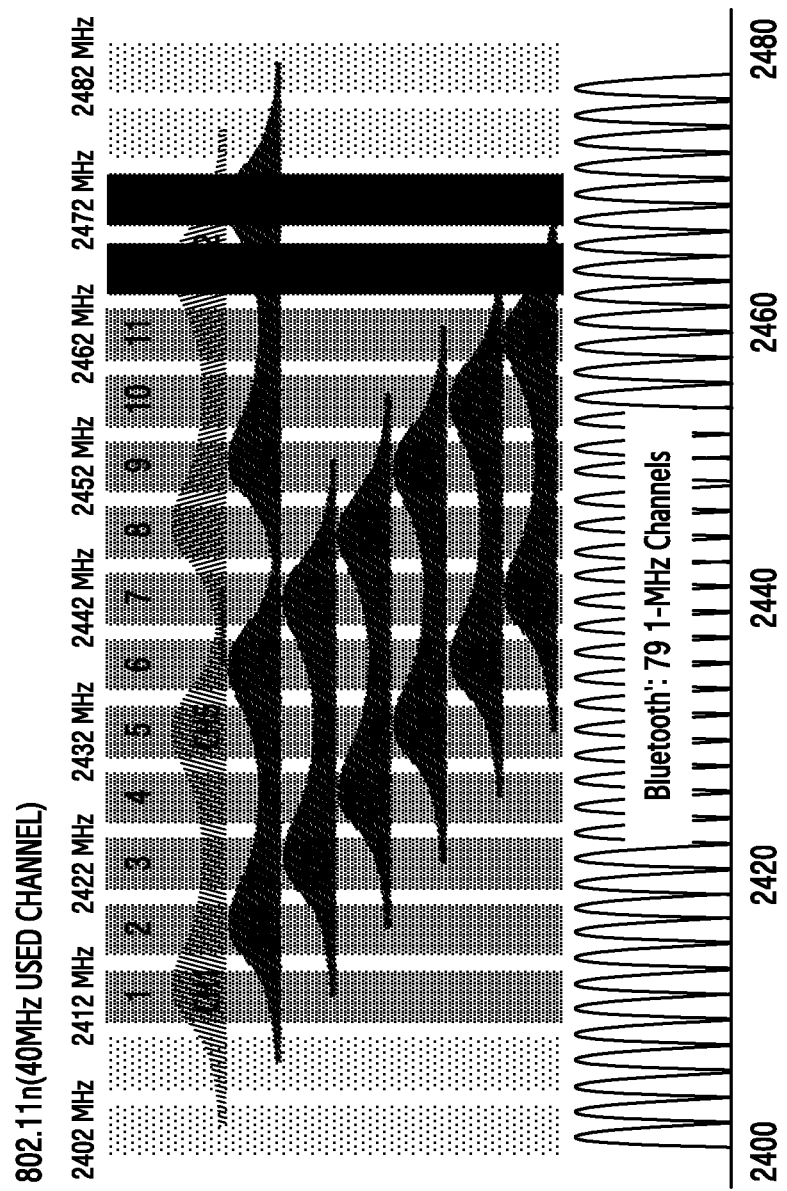
FIG. 4 illustrates frequency bands of Wi-Fi channel bonding and a Bluetooth channel according to an embodiment of the present invention.

FIG. 4 illustrates frequency bands of Wi-Fi channel bonding and a Bluetooth channel according to an embodiment of the present invention.

In FIG. 4, a horizontal axis represents a frequency (i.e., MHz), and a vertical axis represents the strength of a signal. FIG. 4 shows thirteen Wi-Fi channels, where some Wi-Fi channels have overlapped portions. These portions are referred to as channel bonding. A channel bonding portion uses both of the two adjacent Wi-Fi channels.

Figure 5:
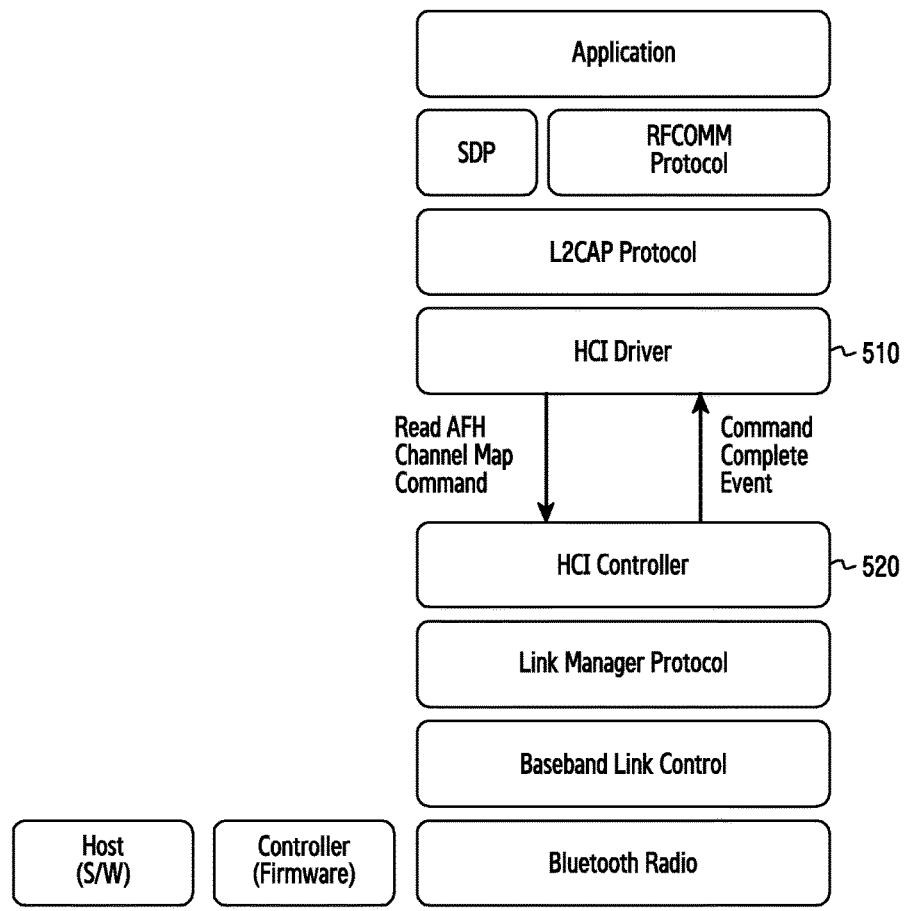
FIG. 5 is a block diagram for determining a channel using an Adaptive Frequency Hopping (AFH) channel map according to an embodiment of the present invention.

FIG. 5 is a block diagram for deciding a channel using an AFH channel map according to an embodiment of the present invention.

Referring to FIG. 5, an electronic device determines a channel through the AFH channel map. Current AFH channel map information may be checked through a read AFH channel map command among Host Controller Interface (HCI) commands. If an HCI driver 510 transmits the read AFH channel map command to an HCI controller 520, the HCI controller 520 transmits a command complete event return parameter to the HCI driver 510. If the return parameter is using a bit channel among 79 bits fields of the AFH channel map, the return parameter may be expressed as "1" and, otherwise, "0." It is determined whether the used channel has a good channel state. The electronic device determines a channel for changing a transmission interface, using an AFH channel map value of a Bluetooth channel overlapped by a Wi-Fi channel.

Figure 6:
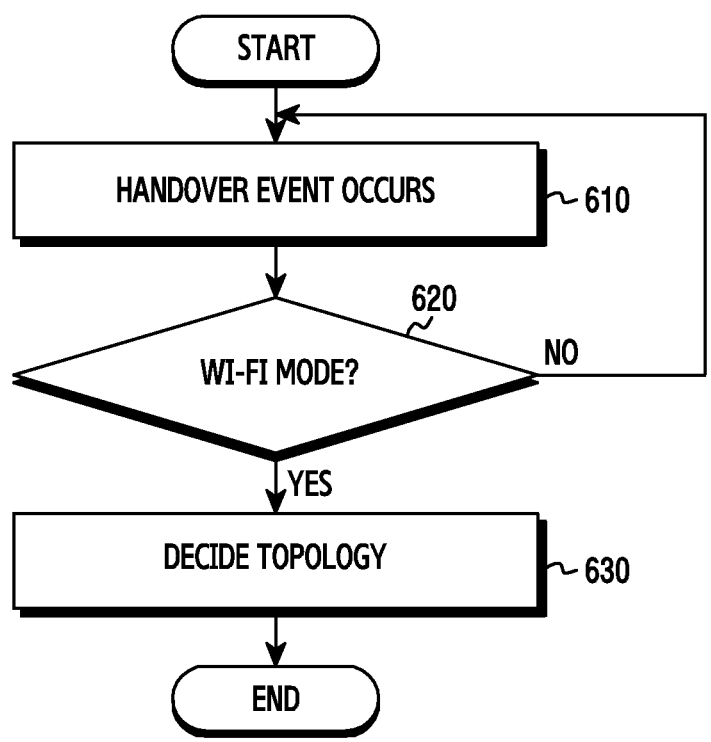
FIG. 6 is a flowchart of a Wi-Fi mode determination method according to an embodiment of the present invention.

FIG. 6 is a flowchart of a method of determining a Wi-Fi mode according to an embodiment of the present invention.

Referring to FIG. 6, in step 610, an electronic device checks a transmission interface change event. The transmission interface change event takes place when it is determined that there is a need for a change of a transmission interface due to the instability of the existing link, the change of a quality and the like.

In step 620, the electronic device checks if a current transmission interface is a Wi-Fi mode. If the current transmission interface is the Wi-Fi mode, in step 630, the electronic device determines a Wi-Fi topology. The Wi-Fi topology may be an infrastructure mode or a Peer-to-Peer (P2P) mode. In this case, the infrastructure mode performs communication between the electronic device and the other electronic device through a station, and the P2P mode performs communication directly between the electronic device and the other electronic device.

Connecting between the electronic device and the other electronic device may use a Group Owner (GO) and a Group Client (GC). The GO plays a key role in a Wi-Fi connection, and plays a role of an Access Point (AP) of the GC. The GC plays a role in connecting with another GC.

The infrastructure topology can operate in a station mode and concurrently in the station mode and a direct GC mode. In the station mode, connection information of an AP connected with a host device operating in the station mode is forwarded to a counterpart device. While concurrently operating in the station mode and the direct GC mode, the AP connection information is forwarded to the counterpart device in the station mode, and remote GO connection information is forwarded to the counterpart device in the direct GC mode.

The P2P topology can operate in a soft AP mode, concurrently in a station mode and a direct GO mode, in the direct GO mode, or in a default mode. In the soft AP mode, soft AP connection information, i.e., information of a wireless client implemented to play an AP role in software and operating like an AP, is forwarded to the counterpart device. The soft AP mode may not operate concurrently with other modes. Concurrently operating in the station mode and the direct GO mode or in the direct GO mode connects the counterpart device to a GC by forwarding the remote GO connection information to the counterpart device. In the default mode, the soft AP connection information or the remote GO connection information is forwarded to the counterpart device.

Also, the P2P topology includes the direct GC mode. The direct GC mode may include a mode of forwarding the remote GO connection information to the counterpart device, a mode of releasing a direct connection and forwarding the remote GO connection information to the counterpart device, and a mode of releasing direct connection and forwarding the soft AP connection information to the counterpart device.

Figure 7:
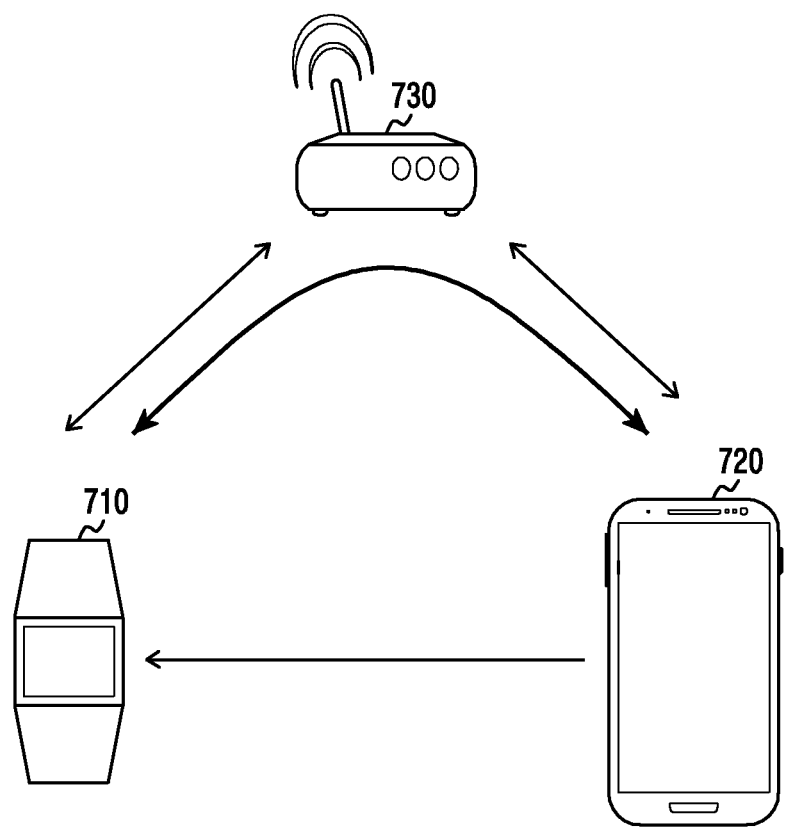
FIG. 7 illustrates a topology of electronic devices communicating through a station according to an embodiment of the present invention.

FIG. 7 illustrates a topology of electronic devices communicating through a station according to an embodiment of the present invention.

Referring to FIG. 7, an electronic device 710 can operate in a station mode and concurrently in the station mode and a direct GC mode. The electronic device 710 may connect with the other electronic device 720 through a station 730, and the electronic device 710 may also directly connect with the other electronic device 720. If the other electronic device 720 is already operating under a Wi-Fi service through the station 730, it is desirable that the electronic device 710 connects with the other electronic device 720 through the station 730. This is because there is a possibility that the other electronic device 720 may drop the existing connection with the station 730 if the electronic device 710 attempts a direct connection with the other electronic device 720. However, if the other electronic device 720 supports different kinds of direct connections with a plurality of devices, it is possible that the electronic device 710 can make a direct connection with the other electronic device 720. In this case, the other electronic device 720 must concurrently support Wi-Fi and Wi-Fi Direct.

According to an embodiment of the present invention, the electronic device 710 includes a plurality of electronic devices. The electronic device 710 may include a plurality of watches of the same type as in FIG. 7 or may include watches or glasses of different types. If one of the plurality of electronic devices supports Bluetooth and Wi-Fi and another device supports Bluetooth, it is desirable that the other electronic device 720 be directly connected with the plurality of electronic devices. For example, a user wearing a watch and glasses while exercising or undergoing a medical examination and the like may be taken into consideration. In a case where the electronic device 710 (e.g., a watch) supports only Bluetooth or is satisfied with only using Bluetooth, the watch provides measurement data such as the user's temperature, pulse, heart rate, blood pressure or the like to the other electronic device 720 through Bluetooth. In this case, the other electronic device 720 may analyze the measurement data and provide a medical analysis image to the electronic device 710 (e.g., glasses) through Wi-Fi.

In a case where the other electronic device 720 supports different kinds of connections with the plurality of electronic devices, it is also possible that the other electronic device 720 analyzes data provided from the electronic device 710 (e.g., a watch) through Bluetooth and provides a medical analysis image to the electronic device 710 (e.g., glasses) through the station 730. However, if considering the optimization of a data transmission path, it is desirable that the other electronic device 720 be directly connected with the plurality of electronic devices. In this case, where the other electronic device 720 is under a service of high priority order, a service of real-time streaming playback, or the like through the station 730, the electronic device 710 may connect with the other electronic device 730 through the station 730, or expect an end of the service and the like and attempt a direct connection later, or notify a user of this and determine a connection scheme based on the user's selection, in consideration of a network policy or a user's preference.

Figure 8:
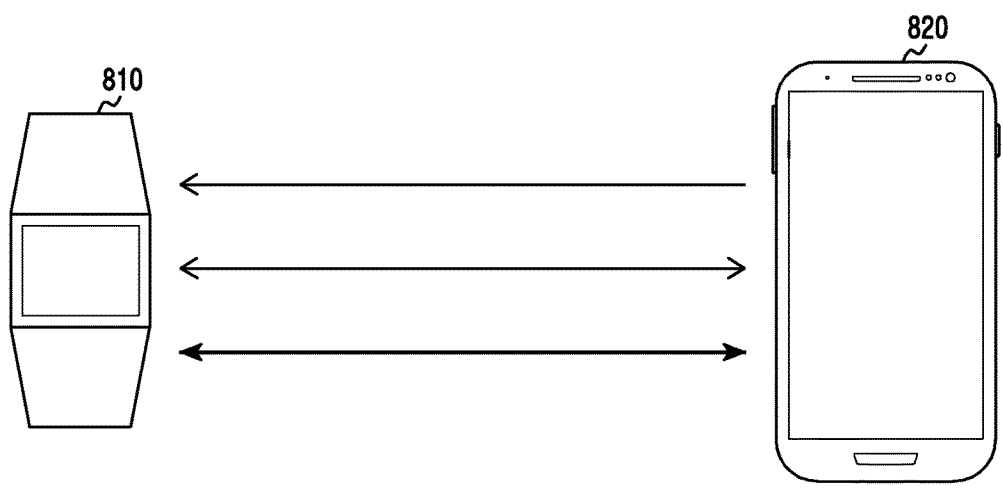
FIG. 8 illustrates a topology of electronic devices directly communicating with each other according to an embodiment of the present invention.
Figure 9A:
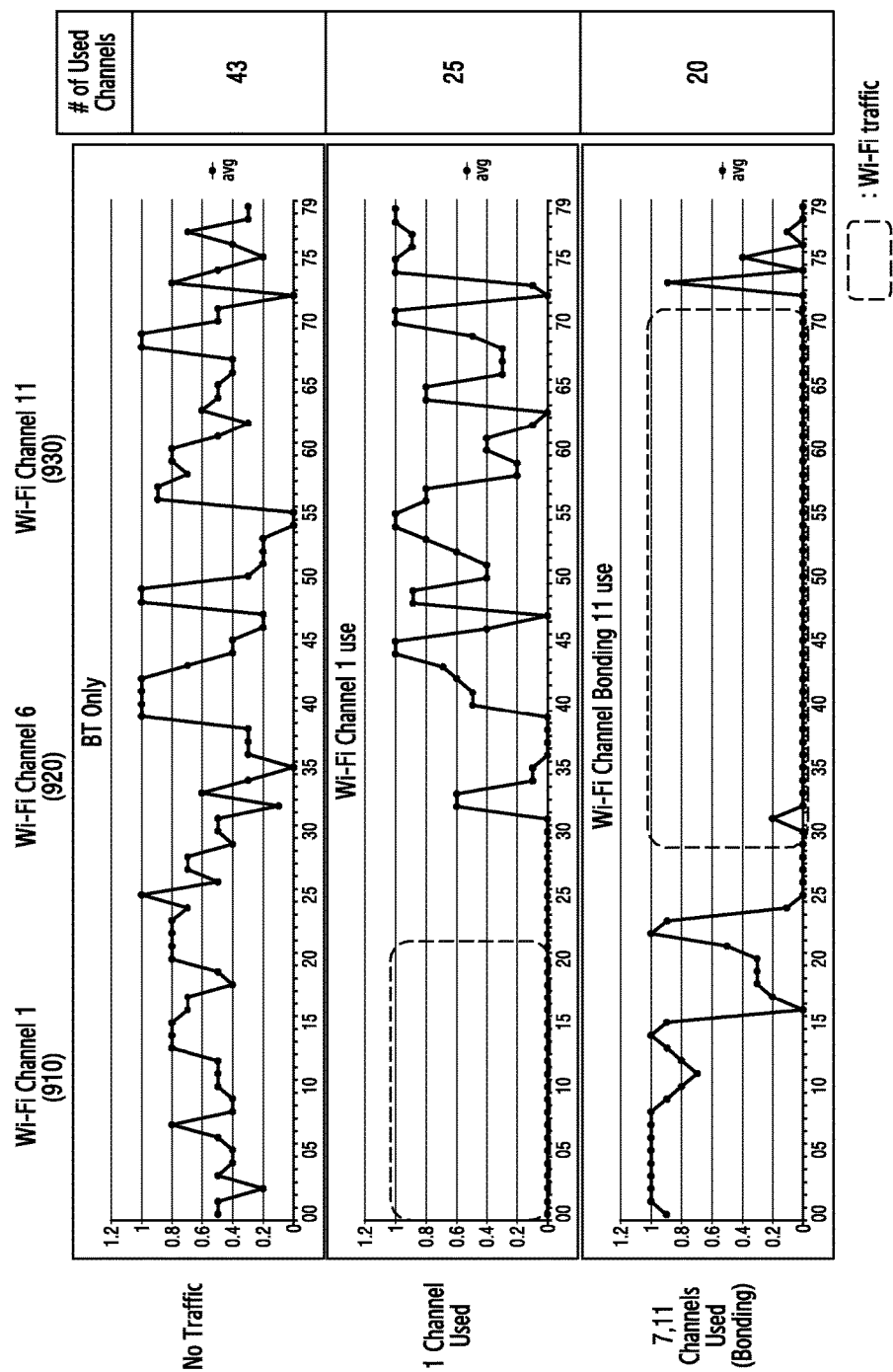
FIGS. 9A to 9D illustrate checking validity of a Bluetooth AFH channel map according to an embodiment of the present invention.
Figure 9B:
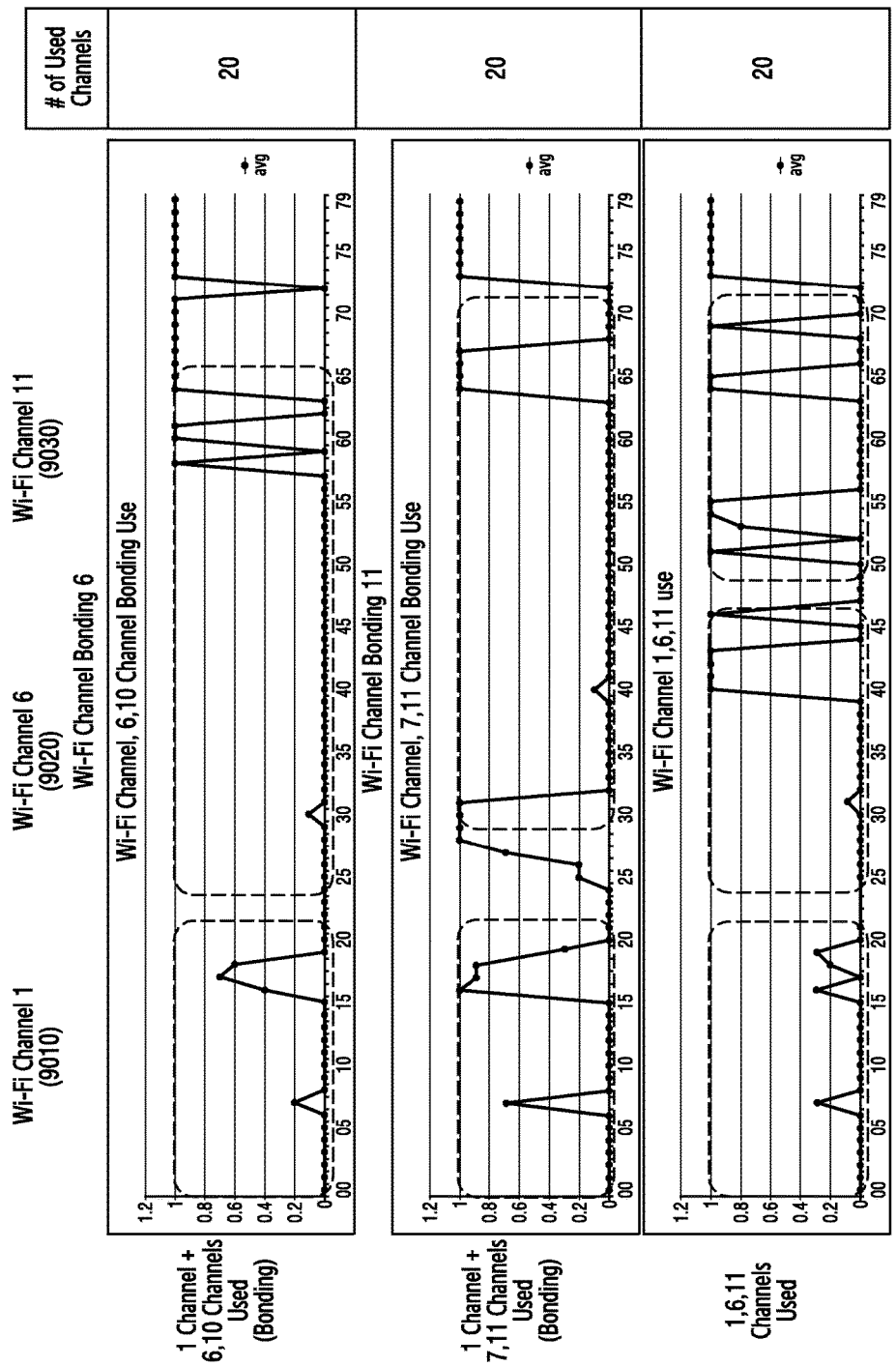
Figure 9C:
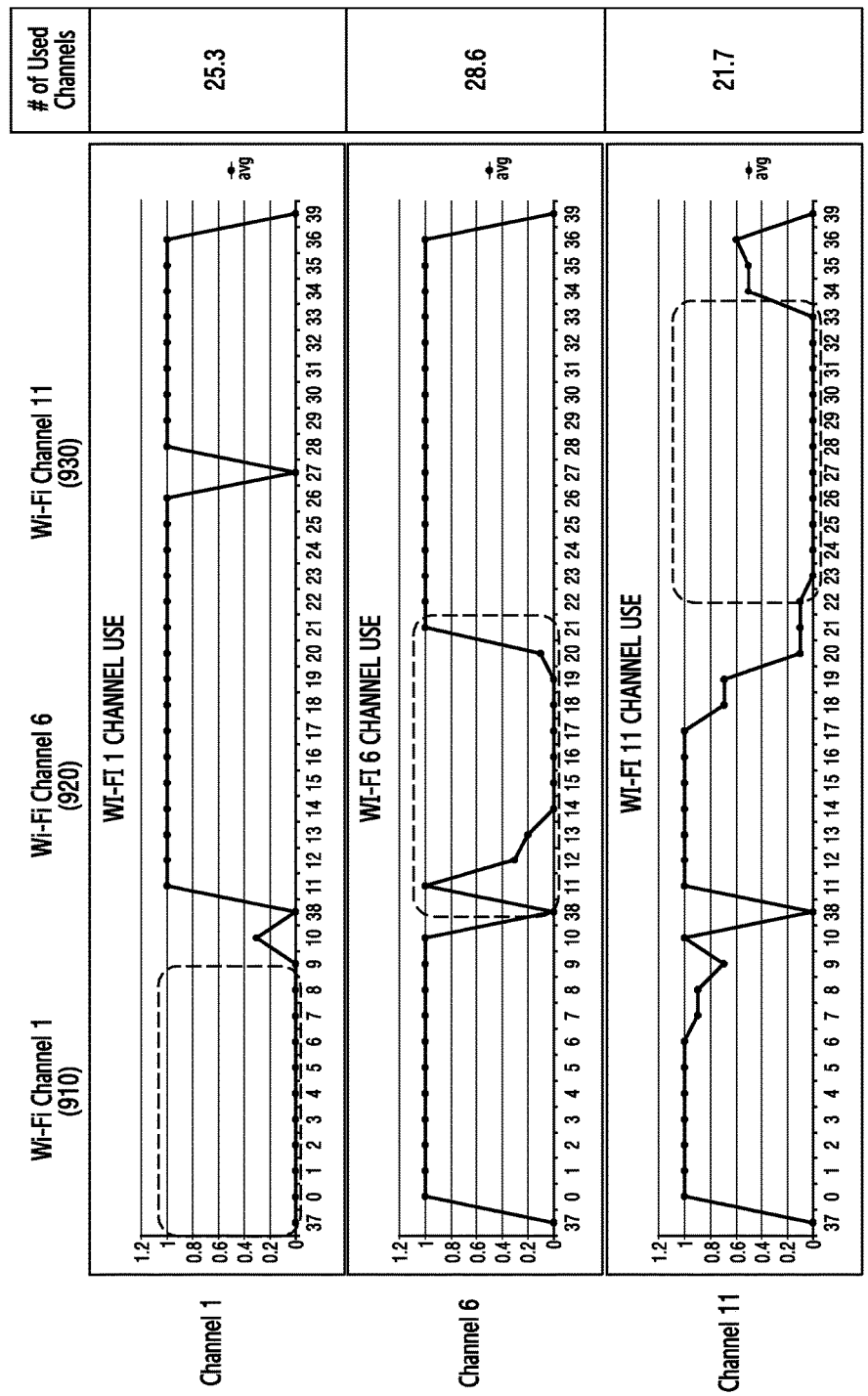
Figure 9D:
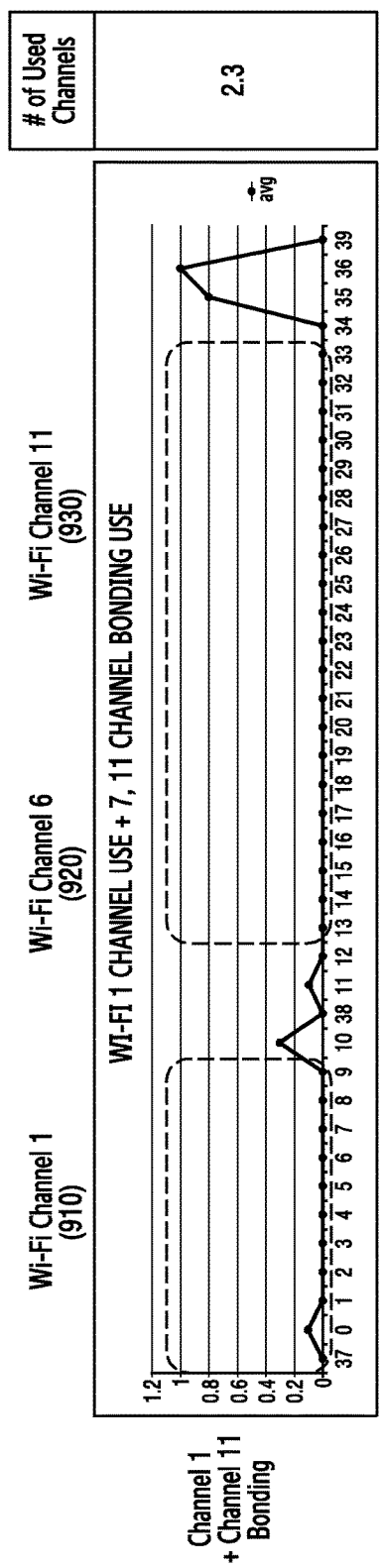

FIG. 8 illustrates a topology of electronic devices directly communicating with each other according to an embodiment of the present invention.

Referring to FIG. 8, an electronic device 810 can operate in a soft AP mode, concurrently in a station mode and a direct GO mode, in the direct GO mode, or in a default mode. In the soft AP mode, the electronic device 810 directly connects with the other electronic device 820 by forwarding soft AP connection information, i.e., information of a wireless client implemented to play an AP role in software and operating like an AP, to the other electronic device 82. While concurrently operating in the station mode and the direct GO mode or in the direct GO mode, the electronic device 810 may directly connect to the other electronic device 820 by forwarding remote GO connection information to the other electronic device 820 and connecting the other electronic device 820 to a GC. While operating in the default mode, the electronic device 810 may directly connect with the other electronic device 820 by forwarding the soft AP connection information or the remote GO connection information to the counterpart device 820.

FIGS. 9A to 9D illustrate checking validity of a Bluetooth AFH channel map according to an embodiment of the present invention.

In FIGS. 9A to 9D, horizontal axes represent Bluetooth channels, and vertical axes represent Bluetooth AFH channel map values after traffic generation.

Referring to FIGS. 9A to 9D, if there is no traffic, each of Wi-Fi channels 910, 920 and 930 has the AFH channel map value. However, if there is traffic, the AFH channel map values are equal to "0" depending on the used channels.

Figure 10:
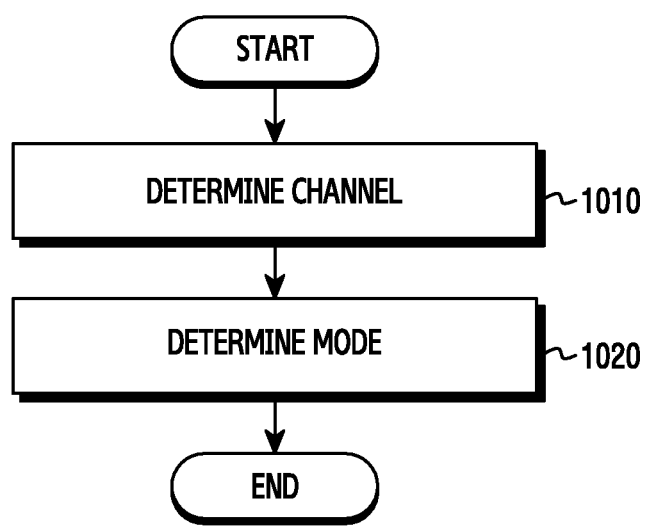
FIG. 10 is a flowchart of a Wi-Fi connection determination method according to an embodiment of the present invention.

FIG. 10 is a flowchart of a Wi-Fi connection determination method according to an embodiment of the present invention.

Referring to FIG. 10, in step 1010, the electronic device determines a channel. The electronic device checks the occurrence of a Wi-Fi connection event, measures the qualities of the Bluetooth channels, and selects a Wi-Fi channel that overlaps with the Bluetooth channel of the best quality among the measured qualities of the Bluetooth channels In step 1020, the electronic device determines a Wi-Fi mode. To determine the Wi-Fi mode of the best service quality, the electronic device performs a change of a network topology and makes a connection with the other electronic device.

Figure 11:
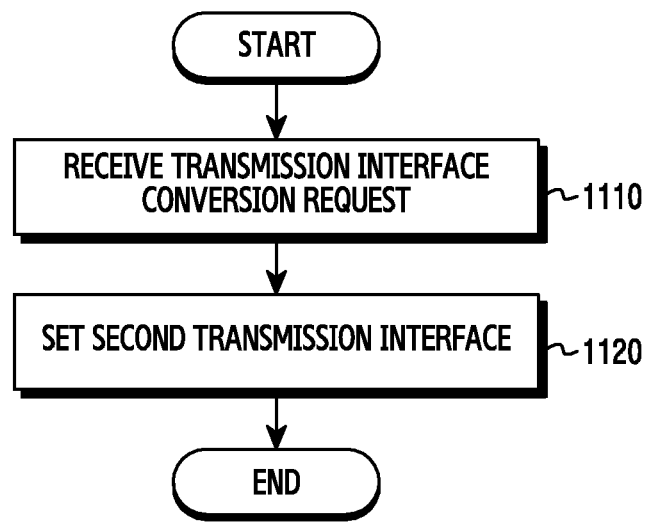
FIG. 11 is a flowchart of a method of communication between a terminal and an electronic device according to an embodiment of the present invention.

FIG. 11 is a flowchart of a method of communication between a terminal and an electronic device according to an embodiment of the present invention.

Referring to FIG. 11, the terminal communicates with the electronic device through a transmission interface.

In step 1110, the terminal receives a transmission interface conversion request from the electronic device. The transmission interface conversion request occurs when there is a need for a change from a currently used transmission interface of the electronic device to another transmission interface. If the electronic device sends the terminal the transmission interface conversion request, the electronic device transmits channel information to the terminal. The channel information includes information about a channel whose channel quality is greater than or equal to a reference value.

In step 1120, in response to the transmission interface conversion request of the electronic device, the terminal sets a second transmission interface through a selected channel. For example, the terminal may communicate with the electronic device through a Bluetooth network while, in response to a transmission interface change request received from the electronic device, communicate using a Wi-Fi network with the electronic device through the selected channel.

Figure 12:
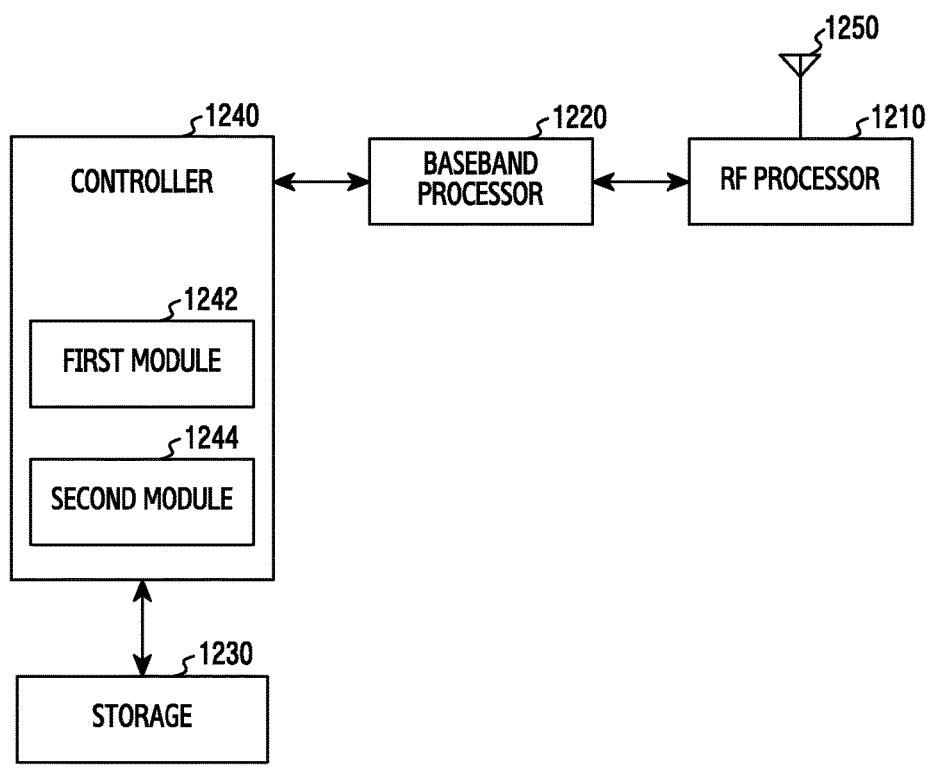
FIG. 12 is a block diagram of an apparatus for channel selection according to an embodiment of the present invention.

FIG. 12 is a block diagram of an apparatus for channel selection according to an embodiment of the present invention.

Referring to FIG. 12, the apparatus includes a Radio Frequency (RF) processor 1210, a baseband processor 1220, storage 1230, a controller 1240, and an antenna 1250.

The RF processor 1210 transmits/receives a signal through a wireless channel, such as signal band conversion, amplification and the like. That is, the RF processor 1210 up converts a baseband signal provided from the baseband processor 1220 into an RF band signal and then transmits the RF band signal through the antenna 1250, and down converts an RF band signal received through the antenna 1250 into a baseband signal. In FIG. 12, only one antenna 1250 is illustrated, but the transmit end may have a plurality of antennas.

The baseband processor 1220 converts a baseband signal to a bit stream and vice versa in compliance with a physical layer standard of a system. For example, during data transmission, the baseband processor 1220 generates complex symbols by encoding and modulating a transmission bit stream. During data reception, the baseband processor 1220 restores a reception bit stream by demodulating and decoding a baseband signal provided from the RF processor 1210. For example, in a case of using an Orthogonal Frequency Division Multiplexing (OFDM) scheme, at data transmission, the baseband processor 1220 generates complex symbols by encoding and modulating a transmission bit stream, maps the complex symbols to subcarriers, and constructs OFDM symbols through an Inverse Fast Fourier Transform (IFFT) operation and Cyclic Prefix (CP) insertion. During data reception, the baseband processor 1220 divides a baseband signal provided from the RF processor 1210 in the unit of an OFDM symbol, and restores signals mapped to subcarriers through a Fast Fourier Transform (FFT) operation, and restores a reception bit stream through demodulation and decoding. The baseband processor 1220 and the RF processor 1210 transmit and receive a signal as described above. Accordingly, the baseband processor 1220 and the RF processor 1210 may be denoted as a transmitter, a receiver, a transmitter/receiver, a transceiver, or a communicator.

The storage 1230 stores data such as a program for an operation of the apparatus for transmission rate control, an application program, setting information, and the like. For example, the storage 1230 may store information related to a selection of a transmission interface between the electronic device and the other electronic device. In addition, the storage 1230 provides the stored data in response to a request of the controller 1240.

The controller 1240 includes a first module 1242 and a second module 1244, and controls general operations of the apparatus for managing the access of a base station. For example, the controller 1240 transmits a signal through the baseband processor 1220, the RF processor 1210, and the antenna 1250 and accesses the base station. For example, the controller 1240 controls the apparatus for a change of the transmission interface to perform the procedures illustrated in FIGS. 2, 6, 10, and 11. In accordance with an embodiment of the present invention, an operation of the controller 1240 is described as follows.

The controller 1240 determines a channel. The controller 1240 checks the occurrence of a Wi-Fi connection event, measures the qualities of Bluetooth channels, and selects a Wi-Fi channel that overlaps with the Bluetooth channel of the best quality among the measured qualities of the Bluetooth channels.

The controller 1240 determines a Wi-Fi mode. To determine the Wi-Fi mode of the best service quality, the controller 1240 performs a change of a network topology and makes a connection with the other electronic device.

An embodiment of the present invention provides a way in which an electronic device may measure a channel of another link through the existing link before the electronic device is connected to the other link.

In an embodiment of the present invention, an electronic device may improve connectivity with another electronic device by determining a channel of the best quality.

Methods according to an embodiment disclosed in the present disclosure may be implemented in a form of hardware, software, or a combination of hardware and software.

If the methods are implemented by the software, a non-transitory computer-readable storage medium storing one or more programs (i.e., software modules) may be provided. The one or more programs stored in the non-transitory computer-readable storage medium are configured to be executed by one or more processors within an electronic device. The one or more programs may include instructions for enabling the electronic device to execute the methods according to the embodiments disclosed in the present disclosure.

These programs (e.g., software modules or software) may be stored in a Random Access Memory (RAM), a non-volatile memory including a flash memory, a Read Only Memory (ROM), an Electrically Erasable Programmable ROM (EEPROM), a magnetic disk storage device, a Compact Disk ROM (CD-ROM), a Digital Versatile Disk (DVD) or an optical storage device of another form, and a magnetic cassette. In addition, the programs may be stored in a memory constructed by a combination of some or all of them. Also, each constructed memory may be included in plural.

Also, the programs may be stored in an attachable storage device accessible to the electronic device through a communication network such as the Internet, an intranet, a Local Area Network (LAN), a Wireless LAN (WLAN) a Storage Area Network (SAN) or a communication network constructed by a combination of them. The storage device may access a device performing an embodiment of the present invention, through an external port. In addition, a separate storage device on the communication network may access the device performing an embodiment of the present invention.

In the aforementioned embodiments of the present invention, constituent elements of the present invention have been expressed in the singular number or the plural number in accordance with the above embodiments. However, for description convenience, the expression of the singular number or the plural number is merely selected suitable to certain situations, and the present invention is not limited to singular or plural constituent elements. In addition, a constituent element expressed in the plural number may be constructed in the singular number, or a constituent element expressed in the singular number may be constructed in the plural number.

While the present invention has been shown and described in a detailed description of the various embodiments, it is obvious that various changes in form and details may be made therein without departing from the scope and spirit of the present invention. Therefore, the scope of the present invention is limited by the described embodiments but is defined by the appended claims and their equivalents.

What is claimed is:

1. An apparatus of an electronic device, comprising:
a first transceiver configured to transmit/receive a signal through a first transmission interface;
a second transceiver configured to transmit/receive a signal through a second transmission interface; and
a controller configured to:
identify, based on a product of a weight and a quality of each of first channels for the first transmission interface between the electronic device and a terminal, a second channel among second channels for the second transmission interface;
control the first transceiver to transmit, to the terminal, information indicating the second channel through the first transmission interface; and
control the second transceiver to transmit/receive, to/from the terminal, a signal via the second channel through the second transmission interface,
wherein the first transmission interface and the second transmission interface are configured to use an overlapped channel frequency band, and
wherein the weight is determined based on orthogonality of the second channels.

2. The apparatus of claim 1, wherein the controller is further configured to:
determine a change from the first transmission interface to the second transmission interface before identifying the second channel.

3. The apparatus of claim 1, wherein the first transmission interface and the second transmission interface are each configured to use an identical channel frequency band.

4. The apparatus of claim 1, wherein the controller is configured to:
determine the quality of the each of the first channels by using the first transmission interface.

5. The apparatus of claim 4, wherein the controller is configured to:
determine qualities of the second channels by using the determined quality of the each of the first channels; and
identify the second channel based on the qualities of the second channel.

6. The apparatus of claim 5,
wherein the first transmission interface provides bluetooth communication and bluetooth channels comprises the first channels, and
wherein the second transmission interface provides wireless fidelity (Wi-Fi) communication and Wi-Fi channels comprises the second channels.

7. The apparatus of claim 5, wherein the controller is configured to:
determine combinations of the each of the first channels, each of the combinations overlapped each of the second channels in a frequency band; and
determine each of the qualities of the second channels by summing qualities of each of the combinations.

8. The apparatus of claim 5, wherein, the controller is configured to:

determine the qualities of the second channels by using an adaptive frequency hopping (AFH) channel map comprising a plurality of bits, and wherein the plurality of bits indicate the qualities of the first channels, respectively.

9. The apparatus of claim 1, wherein when the second transmission interface is wireless fidelity (Wi-Fi) transmission interface, the controller is further configured to determine a mode of connection with the terminal, wherein the mode is at least one connection mode among a relay mode, a direct group client (GC) mode, a direct group owner (GO) mode, a soft Access Point (AP) mode, and a default mode.

10. The apparatus of claim 9, further comprising a transmitter for transmitting information about the determined connection mode to the terminal.

11. An apparatus of a terminal, comprising: a first transceiver configured to transmit/receive a signal through a first transmission interface; a second transceiver configured to transmit/receive a signal through a second transmission interface; and a controller configured to; control the first transceiver to receive, from an electronic device, information indicating a second channel for the second transmission interface through the first transmission interface, and control the second transceiver to transmit/receive, to/from the electronic device, signal via the second channel through the second transmission interface, wherein the second channel is identified based on a product of a weight and a quality of each of first channels for the first transmission interface between the electronic device and the terminal, and wherein the first transmission interface and the second transmission interface are configured to use an overlapped channel frequency band, and wherein the weight is determined based on orthogonality of the second channels.

12. The apparatus of claim 11, wherein the quality of the each of the first channels is measured before the information is received.

13. The apparatus of claim 11, wherein the first transmission interface and the second transmission interface are each configured to use an identical channel frequency band.

14. The apparatus of claim 11, wherein the controller is further configured to determine the second channel whose channel quality is greater than or equal to a reference value.

15. The apparatus of claim 14, wherein the controller is further configured to set the second channel for transmitting/receiving the signal to/from an electronic device through the second transmission interface in response to receiving the information through the first transmission interface.

16. The apparatus of claim 14, wherein the first transmission interface provides bluetooth communication and bluetooth channels comprises the first channels, and wherein the second transmission interface provides wireless fidelity (Wi-Fi) communication and Wi-Fi channels comprise the second channel.

17. The apparatus of claim 14, wherein combinations of the each of the first channels are determined, each of the combinations overlapped each of the second channels in a frequency band, and wherein each of the qualities of the second channels is determined by summing qualities of each of the combinations.

18. The apparatus of claim 11, wherein, when the second transmission interface is a wireless fidelity (Wi-Fi) transmission interface, the controller is further configured to communicate by a connection mode determined through the electronic device.

19. The apparatus of claim 18, wherein the controller is further configured to communicate through at least one determined connection mode among a relay mode, a direct group client (GC) mode, a direct group owner (GO) mode, a soft access point (AP) mode, and a default mode.

20. The apparatus of claim 18, further comprising a receiver for receiving information about the determined connection mode from the electronic device.

21. A method for operating an electronic device, the method comprising:

transmitting/receiving a signal through a first transmission interface;

transmitting/receiving a signal through a second transmission interface;

identifying, based on a product of a weight and a quality of each of first channels for the first transmission interface between the electronic device and a terminal, a second channel among second channels for the second transmission interface;

transmit, to a terminal, information indicating the second channel through the first transmission interface; and transmit/receive, to/from the terminal, a signal via the second channel through the second transmission interface, wherein the first transmission interface and the second transmission interface are further configured to use an overlapped channel frequency band, and wherein the weight is determined based on orthogonality of the second channels.

22. The method of claim 21, further comprising:

determining a change from the first transmission interface to the second transmission interface before identifying the second channel.

23. The method of claim 21, wherein the first transmission interface and the second transmission interface use an identical channel frequency band.

24. The method of claim 21, wherein identifying the second channel comprises:

determining the quality of the each of the first channels by using the first transmission interface.

25. The method of claim 24, wherein identifying the second channel comprises:

determining qualities of the second channels by using the determined quality of the each of the first channels; and identifying the second channel based on the qualities of the second channels.

26. The method of claim 25, wherein the first transmission interface provides bluetooth communication and bluetooth channels comprises the first channels, and wherein the second transmission interface provides wireless fidelity (Wi-Fi) communication and Wi-Fi channels comprises the second channels.

27. The method of claim 25, wherein determining the qualities of the second channels comprises:

determining combinations of the each of the first channels, each of the combinations overlapped each of the second channels in a frequency band; and determining each of the qualities of the second channels by summing qualities of each of the combinations.

28. The method of claim 25, wherein determining the qualities of the second channels comprises:

determining the qualities of the second channels by using an adaptive frequency hopping (AFH) channel map comprising a plurality of bits, and wherein the plurality of bits indicate the qualities of the first channels, respectively.

29. The method of claim 21, further comprising:
determining a mode of connection with the terminal when the second transmission interface is a wireless fidelity (Wi-Fi) transmission interface,
wherein selecting the channel comprises at least one connection mode among a relay mode, a direct group client (GC) mode, a direct group owner (GO) mode, a soft access point (AP) mode, and a default mode.

30. The method of claim 29, further comprising transmitting the determined connection mode to the terminal.

31. A method for operating a terminal, the method comprising:
transmitting/receiving a signal through a first transmission interface;
transmitting/receiving a signal through a second transmission interface;
receive, from an electronic device, information indicating a second channel for the second transmission interface through the first transmission interface; and
transmit/receive, to/from the electronic device, a signal via the second channel through the second transmission interface,
wherein the second channel is identified based on a product of a weight and a quality of each of first channels for the first transmission interface between the electronic device and a terminal,
wherein the first transmission interface and the second transmission interface are configured to use an overlapped channel frequency band, and
wherein the weight is determined based on orthogonality of the second channels.

32. The method of claim 31, wherein the quality of the each of the first channels is measured before the information is received.

33. The method of claim 31, wherein the first transmission interface and the second transmission interface use an identical channel frequency band.

34. The method of claim 31, wherein the second channel is determined as a channel whose channel quality is greater than or equal to a reference value.

35. The method of claim 34, further comprising setting the second channel for transmitting/receiving the signal to/from the electronic device through the second transmission interface in response to receiving the information through the first transmission interface.

36. The method of claim 34, wherein the first transmission interface provides bluetooth communication and bluetooth channels comprises the first channels, and
wherein the second transmission interface provides wireless fidelity (Wi-Fi) communication and Wi-Fi channels comprises the second channels.

37. The method of claim 34, wherein combinations of the each of the first channels are determined, each of the combinations overlapped each of the second channels in a frequency band, and
wherein each of the qualities of the second channels is determined by summing qualities of each of the combinations.

38. The method of claim 31, further comprising, when the second transmission interface is a wireless fidelity (Wi-Fi) transmission interface, communicating by a connection mode determined through an electronic device.

39. The method of claim 38, further comprising communicating through at least one determined connection mode among a relay mode, a direct group client (GC) mode, a direct group owner (GO) mode, a soft access point (AP) mode, and a default mode.

40. The method of claim 38, further comprising receiving information about the determined connection mode from the electronic device.

* * * * *